United States Patent [19]

Leach et al.

[11] Patent Number: 4,830,761

[45] Date of Patent: May 16, 1989

[54] COOLING TOWER CLEANING SYSTEM

[76] Inventors: Jack S. Leach, 3211 Sam Houston, Sugarland, Tex. 77479; Thomas H. Baize, P.O. Box 10007, Missouri City, Tex. 77459

[21] Appl. No.: 187,816

[22] Filed: Apr. 29, 1988

[51] Int. Cl.$^4$ .............................................. C02F 1/00
[52] U.S. Cl. ....................................... 210/785; 55/85; 55/228; 210/805; 210/806; 210/167; 210/195.1; 210/258; 210/260; 261/DIG. 11
[58] Field of Search ................. 55/85, 86, 228, 242, 55/341 NT; 210/167, 314, 195.1, 257.1, 258, 260, 785, 803, 805, 806; 261/DIG. 11, DIG. 46; 209/315

[56] References Cited

U.S. PATENT DOCUMENTS

| | | | |
|---|---|---|---|
| 3,068,167 | 12/1962 | White | 209/315 |
| 3,842,461 | 10/1974 | Wurster | 55/228 X |
| 4,306,967 | 12/1981 | Trautwein | 210/167 |
| 4,362,628 | 12/1982 | Kennedy et al. | 261/DIG. 11 X |
| 4,401,576 | 8/1983 | Meurer | 210/803 |
| 4,464,315 | 8/1984 | D'Leory | 261/DIG. 46 X |

FOREIGN PATENT DOCUMENTS 1513839  6/1978  United Kingdom .................. 55/85

Primary Examiner—Charles Hart
Attorney, Agent, or Firm—Neal J. Mosely

[57] ABSTRACT

A portable, manned method and apparatus for cleaning cooling towers having a water collection basin at the base while permitting the tower to continue in operation comprises removing water and particulate contaminants from the bottom of the tower basin by venturi suction or aspiration through a tubular wand having an elongated wide opening to draw in water and particulate matter from a defined area of contact. The suction wand is moved around the bottom of the cooling tower basin to remove water and particulate matter therefrom. The removed water is filtered to separate coarse contaminant particles therefrom. The filtration is by a plurality of screens positioned one above another of successively finer mesh from top to bottom and having a motor for vibrating the screens to remove collected particulate matter therefrom. A collector is positioned adjacent to the ends of the screens to receive the particulate matter discharged by vibration of the screens by the motor. The filtrate is then passed through a plurality of bag filters of successively smaller porosity ranging from about 400 mesh down to about 1 micron to remove fine particles therefrom. Then the filtrate from the bag filters is recirculated to the cooling tower basin for reuse therein. Part may be is recirculated through the aspirator or venturi to produce a vacuum for withdrawing water and particulate contaminants from the bottom of the tower basin.

10 Claims, 2 Drawing Sheets

COOLING TOWER CLEANING SYSTEM

BACKGROUND OF THE INVENTION

1. Field of the Invention

This invention relates generally to a method and system of apparatus for cleaning cooling towers and more particularly to a method and system of apparatus which permits cooling towers to be cleaned while continuing in operation.

2. Brief Description of the Prior Art

The use of cooling towers in industry is widespread. Cooling towers circulate water over baffles and permit a portion of the water to evaporate to cool the remainder of the cooling water. Some cooling towers may utilize the water which is used in the plant for cooling, while others utilize the evaporative cooling to cool another material circulated in heat exchange therewith. In both types of cooling tower, there is a problem of contamination by dirt and dust picked up from the air and particulate material brought in with the cooling water. Particulate contaminants collect over a period of time in the basin at the bottom of the tower and from time to time the tower must be shut down to clean out the contaminants which have settled therein. Such a cleaning procedure is costly in terms of down-time for the cooling system and the facility cooled by the cooling tower. Consequently, there has been a need for an inexpensive and efficient method and system of apparatus for cleaning cooling towers while permitting them to continue in operation.

The prior art known to applicant does not disclose the present portable, manned method and apparatus for cleaning cooling towers having a water collection basin at the base while permitting the tower to continue in operation which comprises removing water and particulate contaminants from the bottom of the tower basin by venturi suction or aspiration through a tubular wand having an elongated wide opening to draw in water and particulate matter from a defined area of contact. The suction wand is moved around the bottom of the cooling tower basin to remove water and particulate matter therefrom. The removed water is filtered to separate solid contaminant particles therefrom. The filtrate is by a plurality of screens positioned one above another of successively finer mesh from top to bottom and having a motor for vibrating the screens to remove collected particulate matter therefrom. A collector is positioned adjacent to the ends of the screens to receive the particulate matter discharged by vibration of the screens by the motor. The filtrate is then passed through a plurality of bag filters of successively smaller porosity ranging from about 400 mesh down to about 1 micron to remove fine particles therefrom. Then part of filtrate from the bag filters is recirculated to the cooling tower basin for reuse therein and part is recirculated through the aspirator or venturi to produce a vacuum for withdrawing water and particulate contaminants from the bottom of the tower basin.

SUMMARY OF THE INVENTION

It is therefore an object of the present invention to provide an improved method and apparatus for cleaning cooling towers while permitting the tower to continue in operation.

It is another object of this invention to provide an improved method and apparatus for cleaning cooling towers while permitting the tower to continue in operation which removes water and particulate contaminants from the bottom of the tower basin by suction.

It is another object of this invention to provide an improved method and apparatus for cleaning cooling towers while permitting the tower to continue in operation which removes water and particulate contaminants from the bottom of the tower basin by venturi suction or aspiration.

Another object of this invention is to provide an improved method and apparatus for cleaning cooling towers while permitting the tower to continue in operation in which the coarser particles are removed from water removed from the tower basin by multiple screening.

Another object of this invention is to provide an improved method and apparatus for cleaning cooling towers while permitting the tower to continue in operation which removes water and particulate contaminants from the bottom of the tower basins by suction and the coarser particles are removed from water removed from the tower basin by multiple screening.

Another object of this invention is to provide the improved method and apparatus for cleaning cooling towers while permitting the tower to continue in operation in which the finer particles are removed from water removed from the tower basin by multiple bag filters.

A further object of this invention is to provide an improved method and apparatus, for cleaning cooling towers while permitting the tower to continue in operation, which removes water and particulate contaminants from the bottom of the tower basins by suction in which the coarser particles are removed from water removed from the tower basin by multiple screening and the finer particles are removed from water removed from the screens by multiple bag filters.

A still further object of this invention is to provide an improved method and apparatus for cleaning cooling towers while permitting the tower to continue in operation which removes water and particulate contaminants from the bottom of the tower basin by venturi suction or aspiration and in which the coarser particles are removed from water removed from the tower basins by multiple screening and the finer particles are removed from water removed from the tower basins by multiple bag filters.

Other objects of the invention will become apparent from time to time throughout the specification and claims as hereinafter related.

The above noted objects and other objects of the invention are accomplished by a portable, manned method and apparatus for cleaning cooling towers having a water collection basins at the base while permitting the tower to continue in operation which comprises removing water and particulate contaminants from the bottom of the tower basin by venturi suction or aspiration through a tubular wand having an elongated wide opening to draw in water and particulate matter from a defined area of contact. The suction wand is moved around the bottom of the cooling tower basin to remove water and particulate matter therefrom. The removed water is filtered to separate coarse contaminant particles therefrom. The filtration is by a plurality of screens positioned one above another of successively finer mesh from top to bottom and having a motor for vibrating the screens to remove collected particulate matter therefrom. A collector is positioned adjacent to the ends of the screens to receive the particulate matter discharged by vibration of the screens by the motor. The filtrate is then passed through a plurality of bag filters of successively smaller porosity ranging from about 400 mesh down to about 1 micron to remove fine particles therefrom. Then, the filtrate from the bag filters is recirculated to the cooling tower basin for reuse therein. Part is recirculated through the aspirator or venturi to produce a vacuum for withdrawing water and particulate contaminants from the bottom of the tower basin. The invention is further characterized by being portable and man-operated and by being completely recirculating.

DESCRIPTION OF THE PREFERRED EMBODIMENT

The use of cooling towers in industry is widespread. Cooling towers circulate water over baffles and permit a portion of the water to evaporate to cool the remainder of the cooling water. Some cooling towers may utilize the water which is used in the plant for cooling, while others utilize the evaporative cooling to cool another material circulated in heat exchange therewith. In both types of cooling tower, there is a problem of contamination by dirt and dust picked up from the air and particulate material brought in with the cooling water. Particulate contaminants collect over a period of time in the basin at the bottom of the tower as a sludge and from time to time the tower must be shut down to clean out the contaminants which have settled therein. Such a cleaning procedure is costly in terms of downtime for the cooling system and the facility cooled by the cooling tower.

Figure 1:
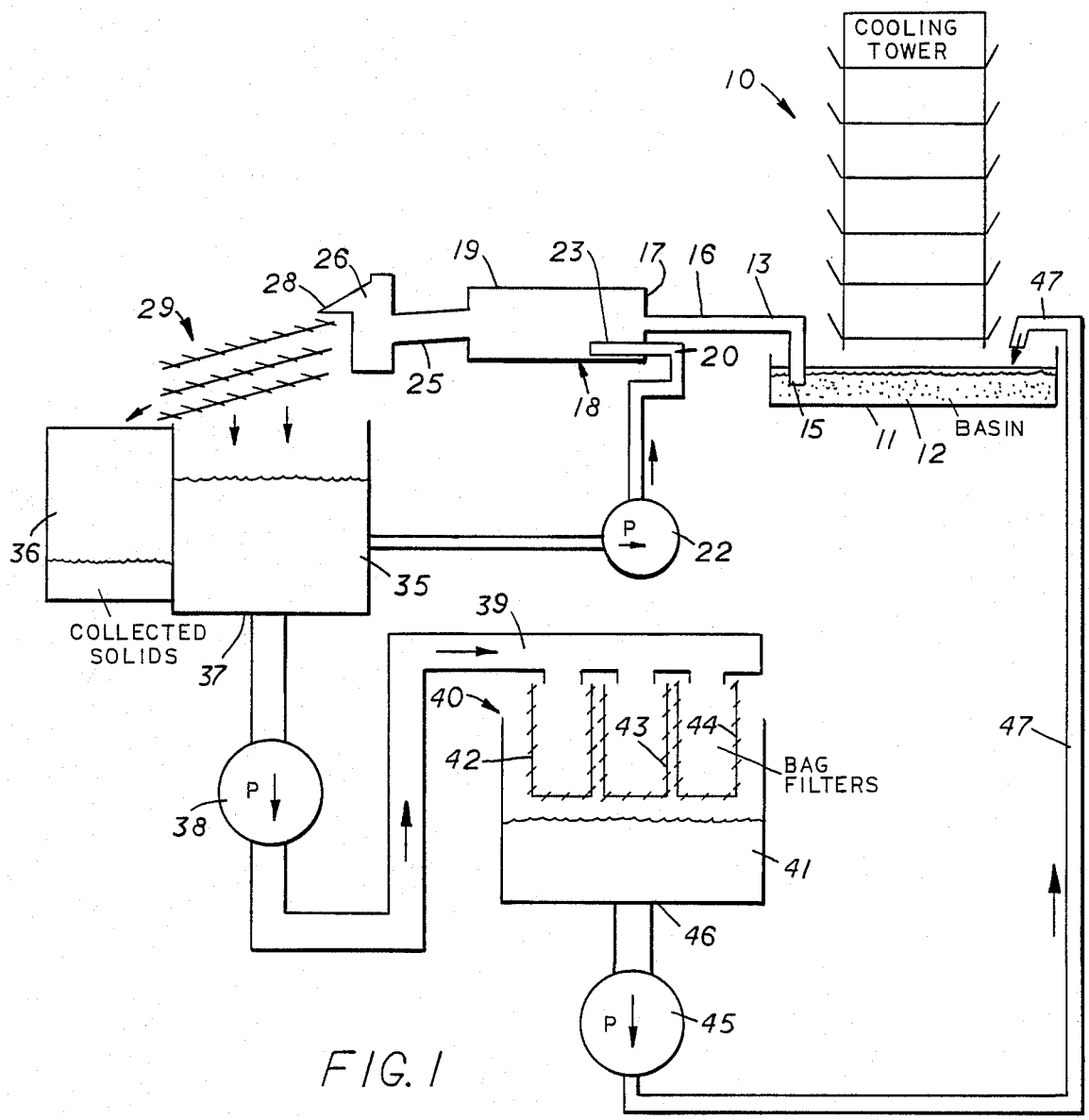
FIG. 1 is a schematic view illustrating a method and apparatus for cleaning cooling towers which is a preferred embodiment of the invention.
Figure 2:
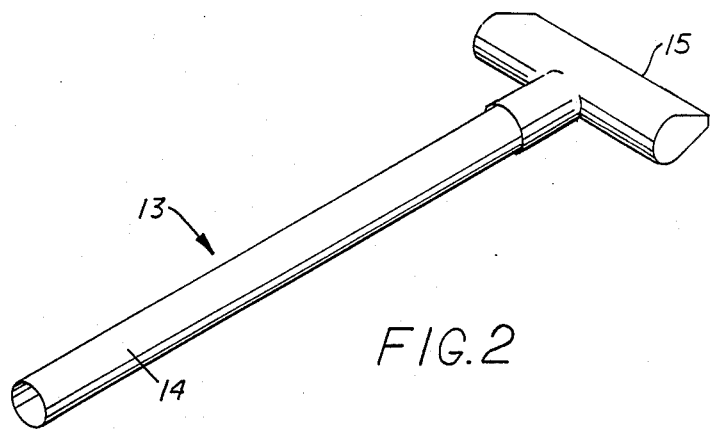
FIG. 2 is a detail isometric view of the suction wand used in this method and apparatus shown in FIG. 1.

In FIG. 1, there is shown a schematic view of a cooling tower and a portable, manned cleaning system, i.e., apparatus and method of use thereof, used to clean the same without the necessity of shutting down the operation of the tower. Cooling tower 10 is of conventional structure and has a catch basin 11 at the bottom for the water which is recirculated for cooling. Catch basin 11 collects water 12 which contains particulate material which has built up over a period of time. It is necessary to clean out the particulate matter from the water used in cooling and this cleaning method and apparatus allows this to be done without shutting down the tower.

The cleaning apparatus, which is portable and man operated, comprises a vacuum wand 13 having a tubular shaft 14 and a flat, wide nozzle 15 which can be moved by hand around the bottom of catch basin 11. Other shapes of nozzles 15 may be used for reaching into corners, around obstacles, etc. Other nozzles may be used where higher suction is needed for removing heavier material. Vacuum wand 13 functions similarly to a wet vacuum machine. Vacuum wand 13 has a flexible conduit 16 connecting tubular shaft 14 to the inlet side 17 of a venturi or aspirator type suction apparatus 18.

Venturi or aspirator type suction apparatus 18 has an exterior housing 19 with an inlet 20 on one side connected to a pump 22. Water flowing through suction apparatus 18 passes through a nozzle or aspirator tube 23 to produce a vacuum which is applied to conduit 16. The vacuum is applied through conduit 16 to vacuum wand 13 to cause water and entrained particulate material to be drawn from the bottom of basin 11.

Figure 3:
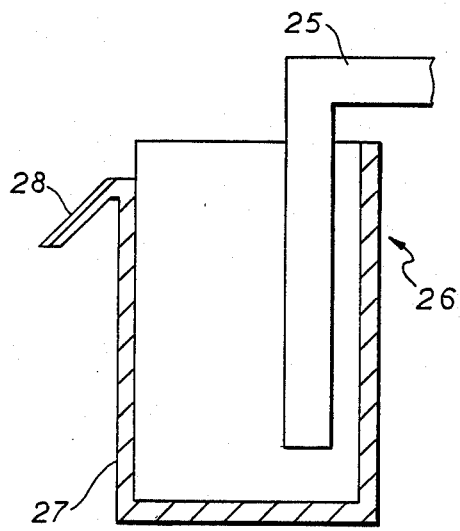
FIG. 3 is a view in vertical central section of the fluid feed or spreader for introducing water removed from the cooling tower basin into the multiple screen apparatus.
Figure 4:
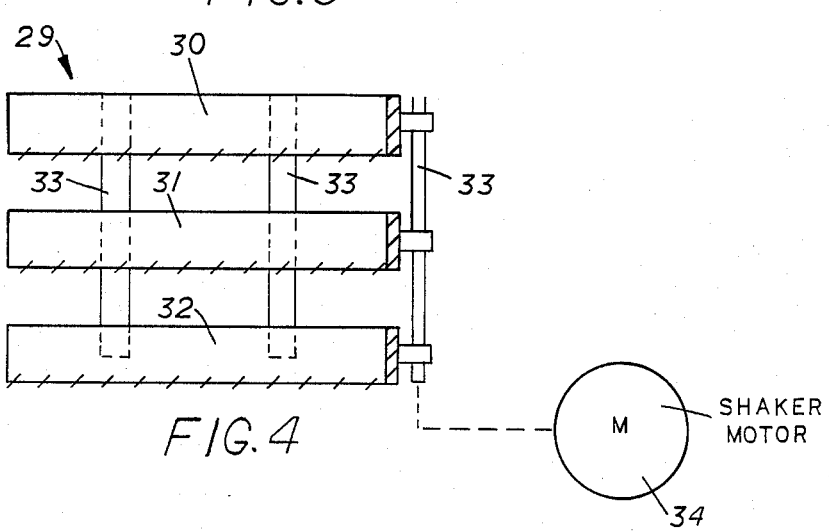
FIG. 4 is a view in vertical central section of the multiple screen apparatus and showing schematically the shaker motor associated therewith.

Water and entrained particulate material flows from suction apparatus 18 through outlet conduit 25 to a fluid distributor 26. In FIG. 3, fluid distributor 26 is shown in section as a hollow chamber 27 having a downwardly folded guide plate 28 which extends across the entire width of a multiple screen assembly 29. Screen assembly 29 consists of a plurality of screens which are graduated successively smaller in size from top to bottom. The screens in assembly 29 may be of any suitable size but are typically from 15 to 30 inches in width. The top screen 30 is 100-200 mesh, the middle screen 31 is 200-300 mesh, and the bottom screen 32 is 300-400 mesh. Screens 30, 31 and 32 are secured together by vertical support rods 33 which are connected to a shaker motor means 34 for shaking or vibrating the screens.

A tank 35 is positioned below screen assembly 29 and a collection bin 36 is positioned below the open ends of the screens. Screens 30, 31 and 32 are enclosed by short sidewalls on three sides and incline downwardly toward their open lower ends. Motor means 34 is typically a ⅓ H.P. electric motor or other suitable shaker mechanism which provides sufficient vibration to operate the shaker screens. The water and entrained particulate matter flows over the screen assembly and passes through the screens into tank 35. The particulate matter collected on the screens flows over the open lower ends of the screens by reason of the vibration of the screens and is collected in bin 36.

Filtrate from the screens 30, 31 and 32 (free of particles above 400 mesh in size) is withdrawn through bottom outlet 37 by pump 38 and distributed through a manifold 39 to a plurality of bag filters 40 positioned over a final collection tank 41. The apparatus shown uses three bag filters 42, 43 and 44 of successively smaller mesh. Bag filter 42 is preferably about 500 mesh, while bag filter 43 has 25 micron openings and bag filter 44 has 5 micron openings. The filtrate from bag filters 42, 43 and 44 is essentially free of all particulate material and ready to be recirculated by the catch basin 11. Pump 45 withdraws filtrate from the bottom opening 46 of tank 41 and causes it to flow through conduit 47 back to basin 11. A side conduit 48 circulates part of the filtrate, i.e. cleaned water, through venturi or aspirator suction device 18.

OPERATION

The operation of this apparatus should be apparent from the foregoing description of its construction and assembly. However, the method of operation will be restated for completeness and clarity.

Water and particulate contaminants are removed from the bottom of the tower basin 11 by venturi suction or aspirator device 18 (other suction means, including pumps may be used) through a tubular wand 13 having a suction nozzle to draw in water and particulate matter from a defined area of contact. Suction wand 13 is moved by hand around the bottom of the cooling tower basin to remove water and particulate matter through nozzle 15. The removed water is filtered to separate coarse contaminant particles by a plurality of screens 30, 31 and 32 positioned one above another of successively finer mesh, e.g. 100-200, 200-300 and 300-400 mesh, from top to bottom and vibrated by motor means 34 or other shaker mechanism for vibrating the screens to remove collected particulate matter into bin 36. The filtrate from screens 30, 31 ans 32 is then passed through a plurality of bag filters 42, 43 and 44 of successively smaller porosity ranging from about 400 mesh down to about 1 micron to remove fine particles therefrom. Then the filtrate from the bag filters is recirculated to the cooling tower basin 11 for reuse therein. Part may be recirculated through the aspirator or venturi to produce a vacuum for withdrawing water and particulate contaminants from the bottom of the tower basin.

While this invention has been described fully and completely with special emphasis upon a preferred embodiment, it should be understood that within the scope of the appended claims the invention may be practiced otherwise than as specifically described herein.

We claim:

1. A method for cleaning cooling towers having a water collection basin at the base while permitting the tower to continue in operation which comprises
   removing water and particulate contaminants from the bottom of the tower basin by venturi suction or aspiration through a tubular wand having an elongated wide opening to draw in water and particulate material from a defined area of contact and manually moved around the bottom of said cooling tower basin to remove water and particulate matter therefrom,
   filtering said recovered water to separate coarse contaminant particles therefrom,
   passing the filtrate through a plurality of bag filters to remove fine particles therefrom,
   recirculating filtrate from said bag filters to said cooling tower basin for reuse therein, and
   recirculating part of the water recovered as filtrate through an aspirator or venturi to produce the vacuum for withdrawing said water and particulate contaminants from the bottom of the tower basin.

2. A method according to claim 1 in which
   said coarser particles are removed from the mixture water and particles removed from the tower basin by multiple screening.

3. A method according to claim 1 in which
   said finer particles are removed from the mixture water and particles removed as filtrate from the multiple screening by passing said filtrate through a plurality of bag filters of successively smaller porosity ranging from about 400 mesh down to about 1 micron.

4. A method according to claim 1 in which
   said water and particulate contaminants are removed from the bottom of the tower basin by venturi suction or aspiration, and
   said water and particulate contaminants are removed from the bottom of the tower basin by venturi suction or aspiration through a tubular wand having an elongated wide opening to draw in water and particulate matter from a defined area of contact,
   said coarser particles are removed from the mixture water and particles removed from the tower basin by multiple screening, and
   said finer particles are removed from the mixture water and particles removed as filtrate from the multiple screening by passing said filtrate through a plurality of bag filters of successively smaller porosity ranging from about 400 mesh down to about 1 micron.

5. A portable, manned apparatus for cleaning cooling towers having a water collection basin at the base while permitting the tower to continue in operation which comprises
   venturi suction or aspiration means including a tubular wand having an elongated wide opening to draw in water and particulate material from a defined area of contact operable to be positioned in the bottom of the tower basin to remove a mixture of water and particulate contaminants therefrom,
   filter means to separate coarse contaminant particles from said mixture of water and particulate contaminants,
   a plurality of bag filters to remove fine particles from the filtrate from said filter means,
   pump means for circulating filtrate from said filter means to said bag filters,
   pump means connected to recirculate filtrate through said aspirator or venturi suction means to produce a vacuum for withdrawing said water and particulate contaminants from the bottom of the tower basin, and
   pump means connected to recirculate filtrate from said bag filters to said cooling tower basin for reuse therein.

6. An apparatus according to claim 5 in which
   said filter means comprises a plurality of screens positioned one above another of successively finer mesh from top to bottom, and
   motor means for vibrating said screens to remove collected particulate matter therefrom.

7. An apparatus according to claim 6 in which
   said plurality of bag filters are of successively smaller porosity ranging from about 400 mesh down to about 1 micron.

8. An apparatus according to claim 5 in which
   said suction means for removing water and particulate contaminants from the bottom of the tower basin is venturi suction or aspiration means,
   said venturi suction or aspiration means includes a tubular wand having an elongated wide opening to draw in water and particulate matter from a defined area of contact,
   said filter means comprises a plurality of screens positioned one above another of successively finer mesh from top to bottom, and
   motor means for vibrating said screens to remove collected particulate matter therefrom.

9. An apparatus according to claim 5 in which
   said suction means for removing water and particulate contaminants from the bottom of the tower basin is venturi suction or aspiration means,
   said venturi suction or aspiration means includes a tubular wand having an elongated wide opening to draw in water and particulate matter from a defined area of contact,
   said filter means comprises a plurality of screens positioned one above another of successively finer mesh from top to bottom, motor means for vibrating said screens to remove collected particulate matter therefrom, and collection means positioned adjacent to the ends of said screens to receive the particulate matter discharged by vibration of said screens by said motor means.

10. An apparatus according to claim 5 in which said suction means for removing water and particulate contaminants from the bottom of the tower basin is venturi suction or aspiration means, said venturi suction or aspiration means includes a tubular wand having an elongated wide opening to draw in water and particulate matter from a defined area of contact, said plurality of bag filters are of successively smaller porosity ranging from about 400 mesh down to about 1 micron, said filter means comprises a plurality of screens positioned one above another of successively finer mesh from top to bottom, and motor means for vibrating said screens to remove collected particulate matter therefrom.

* * * * *